(12) United States Patent
Gupta et al.

(10) Patent No.: US 12,468,793 B2
(45) Date of Patent: Nov. 11, 2025

(54) ELECTRONIC DEVICE AND CORRESPONDING METHODS FOR PRECLUDING UNLOCKING OPERATIONS FOR USERS EXPERIENCING STATE OF LAGOPHTHALMOS

(71) Applicant: Motorola Mobility LLC, Chicago, IL (US)

(72) Inventors: Ranjeet Gupta, Aurora, IL (US); Andrew G Wheeler, Arlington Heights, IL (US); Mark A Reed, Algonquin, IL (US); Eric J Hefner, Lombard, IL (US); Thomas Yates Merrell, St. Charles, IL (US)

(73) Assignee: Motorola Mobility LLC, Chicago, IL (US)

( * ) Notice: Subject to any disclaimer, the term of this patent is extended or adjusted under 35 U.S.C. 154(b) by 71 days.

(21) Appl. No.: 18/603,019

(22) Filed: Mar. 12, 2024

(65) Prior Publication Data
US 2025/0291887 A1 Sep. 18, 2025

(51) Int. Cl.
*G06F 21/00* (2013.01)
*G06F 21/32* (2013.01)
*G06V 40/16* (2022.01)

(52) U.S. Cl.
CPC ............ *G06F 21/32* (2013.01); *G06V 40/174* (2022.01)

(58) Field of Classification Search
CPC .............................. G06F 21/32; G06V 40/174
See application file for complete search history.

(56) References Cited

U.S. PATENT DOCUMENTS

| | | | |
|---|---|---|---|
| 10,210,318 B2* | 2/2019 | Duggan | G06V 40/166 |
| 2012/0051590 A1* | 3/2012 | Hsu | G04G 13/025 |
| | | | 382/103 |
| 2013/0069988 A1* | 3/2013 | Kamei | G06F 1/1637 |
| | | | 345/658 |
| 2019/0303654 A1* | 10/2019 | Vadassery | G06V 40/172 |
| 2020/0089851 A1* | 3/2020 | Kumar Agrawal | G06V 20/52 |
| 2021/0312024 A1* | 10/2021 | Gupta | H04M 1/72469 |
| 2023/0267233 A1* | 8/2023 | Kusayanagi | G06V 40/172 |
| 2025/0053627 A1* | 2/2025 | Li | A61B 5/6898 |

* cited by examiner

*Primary Examiner* — William A Corum, Jr.
(74) *Attorney, Agent, or Firm* — Philip H. Burrus, IV

(57) ABSTRACT

A method in an electronic device detects, from a user interface, initiation of a device unlocking operation. The method captures, by an image capture device having an image sensor receiving light in response to the initiation of the device unlocking operation, one or more images of a subject situated within an environment of the electronic device. The method determines, by one or more processors operable with the image capture device, whether the one or more images depict the subject in a state of lagophthalmos and precludes, by the one or more processors, the device unlocking operation from completing when the one or more images depict the subject in the state of lagophthalmos.

20 Claims, 8 Drawing Sheets

ELECTRONIC DEVICE AND CORRESPONDING METHODS FOR PRECLUDING UNLOCKING OPERATIONS FOR USERS EXPERIENCING STATE OF LAGOPHTHALMOS

BACKGROUND

Technical Field

This disclosure relates generally to electronic devices, and more particularly to electronic devices having biometric sensors capable of unlocking those electronic devices.

Background Art

Modern portable electronic devices, such as smartphones and tablet computers, are advanced computing devices. In addition to being able to make voice calls and send text or multimedia messages, these devices are capable of executing financial transactions, recording, analyzing, and storing medical information, storing pictures and videos, maintaining calendar, to-do, and contact lists, and even performing personal assistant functions. To perform such a vast array of functions, these devices sometimes store "private" data about the user. This private data may include data relating to their location, financial status, travels, health status, activities, friends, and more.

With such personal information stored in the device, it is desirable to ensure that only the user—or those authorized by the user—have access to this data. At the same time, it is desirable to provide for a simple, quick, and easy user interface that allows for quick access to the device. It would be advantageous to have an improved system helping to ensure that only authorized users of an electronic device are able to gain access to such information.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
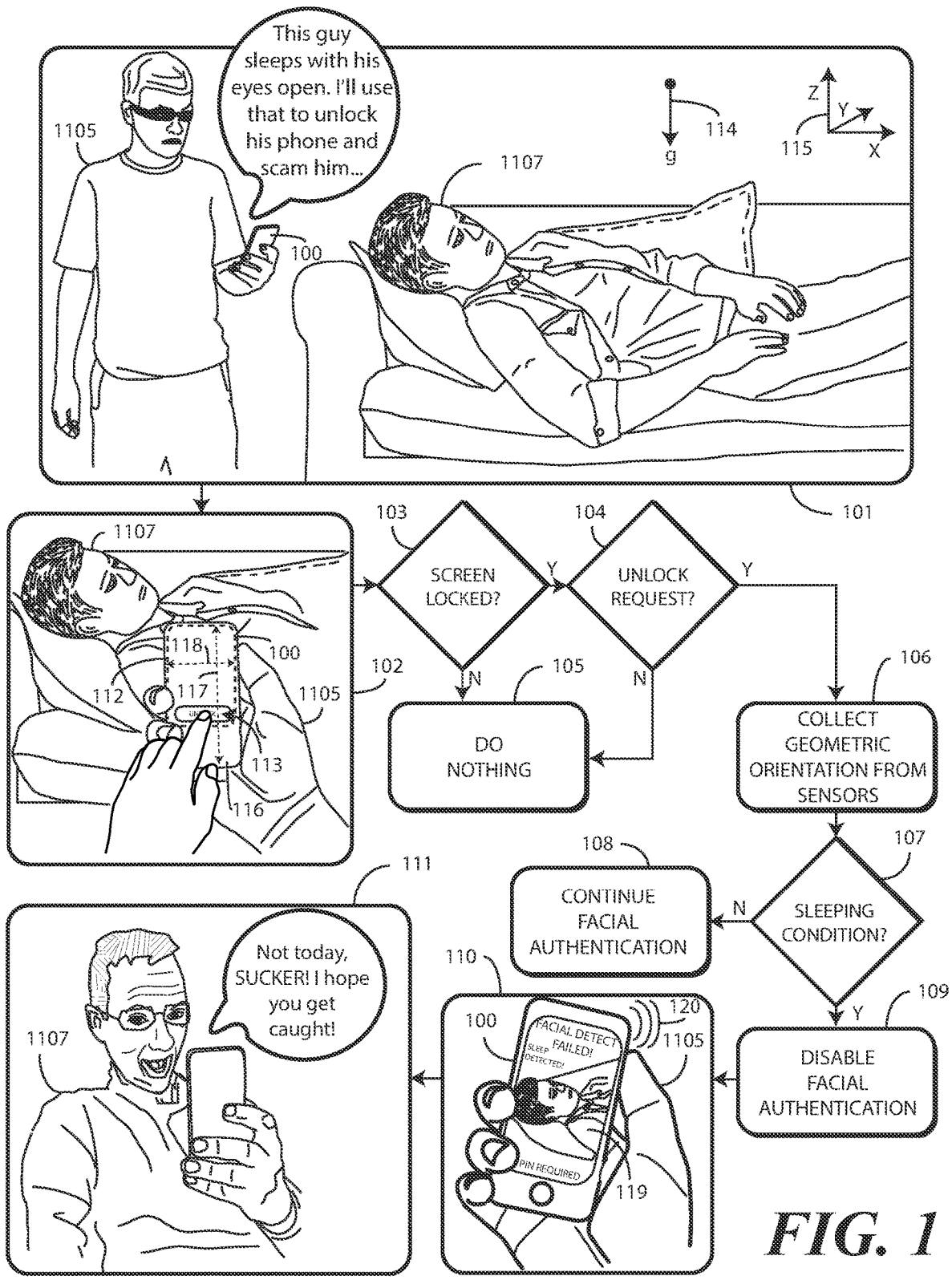
FIG. 1 illustrates one explanatory method in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related detecting, from a user interface, initiation of a biometric device unlocking operation from user input, determining, using one or more sensors of the electronic device, an orientation of the electronic device in three-dimensional space relative to a subject, and when the orientation of the electronic device in the three-dimensional space relative to the subject meets at least one predefined criterion, precluding the biometric device unlocking operation from completing. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of, in response to the user interface receiving user input initiating an operation to unlock the electronic device from a locked state, precluding this operation from completing when a detected gravity direction is substantially aligned with a minor dimension of the electronic device extending from a first major surface to a second major surface as described herein, as this is one explanatory device orientation that can be used to take advantage of an authorized user experiencing a state of lagophthalmos. The non-processor circuits may include, but are not limited to, a radio receiver, a radio transmitter, signal drivers, clock circuits, power source circuits, and user input devices. As such, these functions may be interpreted as steps of a method to perform detecting initiation of a device unlocking operation, capturing one or more images of a subject situated within the environment of the electronic device, determining, with one or more processors, whether the one or more processors depict the subject in a state of lagophthalmos, and precluding the device unlocking operation from completing when the one or more images depict the subject in the state of lagophthalmos.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "substantially," as used herein, refers to a range of forty-five degrees. Thus, when a gravity direction and an axis "substantially" align, they are within forty-five degrees of each other.

The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure contemplate that around twenty percent of the people on earth sleep with their eyes open. This is medically known as a state of lagophthalmos or a state of nocturnal lagophthalmos.

Embodiments of the disclosure also contemplate that people who sleep in a state of lagophthalmos are at greater risk of having their personal electronic devices unlocked by nefarious actors when they are sleeping. This is especially true when those electronic devices are equipped with facial recognition sensors that are capable of performing biometric device unlocking operations. Since the person sleeps with their eyes open, embodiments of the disclosure conceive that it is possible for a nefarious actor to use such sensors to authenticate the authorized user while asleep since their eyes are indeed open when in the state of lagophthalmos.

Embodiments of the disclosure also contemplate that when people sleep, they most commonly lie upon a flat surface, examples of which include a bed, cot, floor, sofa, or couch. When resting upon such surfaces, they are generally horizontal with their face oriented upward or sideward. With this in mind, embodiments of the disclosure contemplate that a nefarious actor may be able to take the sleeper's electronic device, place it in front of their face, and use the biometric unlocking sensors to unlock the electronic device and gain access to the data therein. Indeed, testing of commercially available smartphones has confirmed that this is true. Prior art electronic devices are incapable of preventing this operation.

Advantageously, embodiments of the disclosure provide a solution to this problem. Embodiments of the disclosure provide a method to mitigate such attacks as a function of device orientation, device sensor data, the detected direction of gravity, and optionally other factors. Embodiments of the disclosure use this information to restrict execution of a biometric device unlocking operation when the electronic device is in certain orientations in three-dimensional space relative to a subject of the biometric device unlocking operation.

In one or more embodiments, when the user interface of an electronic device is locked, an authorized user of the electronic device can unlock the electronic device in one of several ways. Illustrating by example, in one illustrative embodiment they can press a power key situated along a housing of the electronic device. In one or more embodiments, when this occurs a biometric device unlocking operation is initiated.

In another example, using a sensor-based algorithm the authorized user can lift or raise the electronic device to view the display. When this occurs, one or more processors compute the accelerometer and gyroscope data to compute the angular motion of the electronic device, as well as the angular velocity, which is a vector quantity equal to the angular displacement divide by the change in time occurring during the lifting process. When a motion similar to an arm lifting the electronic device is detected, this can initiate a biometric device unlocking operation. Other techniques for initiating a biometric device unlocking operation will be obvious to those of ordinary skill in the art having the benefit of this disclosure.

With prior art devices, when either initiation process occurs if biometric sensors configured to perform facial recognition detect a face, a biometric device unlocking operation is performed. To illustrate, turn now to FIG. 11 where a nefarious actor 1105 is attempting to gain access to data in a prior art electronic device 1106 while its authorized user 1107 is in a state of lagophthalmos.

Beginning at step 1101, the authorized user 1107 of the prior art electronic device 1106 is in a state of lagophthalmos, where he is sleeping on a sofa with his eyes open. The nefarious actor 1105 sees this, and quickly grabs his prior art electronic device 1106 from a table nearby. The nefarious actor 1105 wishes to use the prior art facial recognition unlocking system to gain access to the data stored in the electronic device.

As shown at step 1101, the nefarious actor 1105 holds the prior art electronic device 1106 in a portrait orientation while a facial recognition process is initiated with one or more biometric sensors capturing one or more images of the authorized user 1107 of the prior art electronic device 1106. Since the authorized user 1107 of the prior art electronic device 1106 is horizontal, these one or more images depict the authorized user 1107 of the prior art electronic device 1106 in a landscape orientation.

Despite this fact, as shown at step 1102 the biometric device unlocking operation completes successfully. Sadly, this allows the nefarious actor 1105 to gain access not only to the data in the prior art electronic device 1106, but also to sensitive applications such as financial applications, banking applications, cash transfer applications, and other tools to basically rob the authorized user 1107 of the prior art electronic device 1106 blind.

At step 1103, the nefarious actor 1105 realizes the treasure trove of data and financial resources he's tapped into. Indeed, the nefarious actor 1105 is now free to hack all financial accounts belonging to the authorized user 1107 of the prior art electronic device 1106. Laughing fiendishly, the nefarious actor 1105 says, "What a sucker. I'm going to drain this dude's account." Paraphrasing the iconic Marc Springer of Snortn' Boar Transport, the nefarious actor 1105 starts chanting, "More money, more money, more money!" As shown at step 1104, the poor authorized user 1107 of the prior art electronic device 1106 now understands he has been scammed. Downtrodden and depressed, he laments all the work that must be done to try and get his precious money back and data back, if that is even possible at this point.

Sadly, situations such as this are all too common. Fortunately, embodiments of the disclosure provide a solution to these problems. In contrast to the prior art electronic device 1106 of FIG. 11, embodiments of the disclosure restrict certain orientations of the electronic device in three-dimensional space relative to the subject when the biometric device unlocking operation is initiated. In one or more embodiments, when the orientation of the electronic device in three-dimensional space relative to the subject meets at least one predefined criterion.

In one or more embodiments, a method in an electronic device comprises detecting, using a user interface, initiation of a biometric device unlocking operation from user input by a subject of the electronic device. In one or more embodiments, the method comprises determining, with one or more sensors of the electronic device, an orientation of the electronic device in three-dimensional space relative to the subject. In one or more embodiments, when the orientation of the electronic device in three-dimensional space relative to the subject meets at least one predefined criterion, the method comprises precluding the biometric device unlocking operation from completing. Otherwise, the method performs the biometric device unlocking operation in one or more embodiments.

In one or more embodiments, the predefined criterion comprises a major axis of a major surface of the electronic device substantially aligning with a gravity direction detected by one or more sensors of the electronic device while one or more images of a subject captured by an image capture device during the biometric device unlocking operation depict the subject in a landscape orientation. In other embodiments, the at least one predefined criterion comprises a minor axis of a major surface of the electronic device substantially aligning with the gravity direction detected by one or more sensors of the electronic device while the one or more images of the subject captured by the image capture device during the biometric device unlocking operation depict the subject in a portrait orientation.

Effectively, in one or more embodiments when the "X" axis of the image capture device aligns with the gravity direction (within a margin of tolerance) and the subject depicted in the one or more images is in landscape orientation, the biometric device unlocking operation will be precluded from completion. By contrast, when the electronic device is in the landscape orientation, as detected by the gravity direction substantially aligning with the "Y" axis of the image capture device, the biometric device unlocking operation will be precluded when the subject of the electronic device is depicted in the portrait orientation.

It should be noted that while precluding the biometric device unlocking operation from completing is one operation that can occur when the at least one predefined criterion is met, other operations can be precluded instead of the biometric device unlocking operation. Illustrating by example, one or more processors of the electronic device may disable device actions/gestures whenever the predefined criterion is met. Additionally, it should be noted that the image capture device need not be situated on the front major surface of the electronic device, as it can be positioned on the rear major surface as well.

In one or more embodiments, the at least one predefined criterion comprises a gravity direction substantially aligning with a minor dimension of a minor surface of the electronic device. Such would be the case, for example, when a person is lying on a horizontal surface relative to the gravity direction and a nefarious actor is holding the electronic device above them in a substantially parallel orientation relative to the gravity direction trying to perform a biometric device unlocking operation from above. In one or more embodiments, when the gravity direction substantially aligns with a minor dimension of a minor surface of the electronic device from a rear major surface to a front major surface, completion of the biometric device unlocking operation will be precluded.

Similarly, in other embodiments the at least one predefined criterion can comprise the gravity direction detected by the one or more sensors of the electronic device being oriented substantially orthogonally relative to depictions of the subject captured by the image capture device during the biometric device unlocking operation while the gravity direction passes through a minor dimension of a minor surface of the electronic device. In other simpler embodiments, completion of the biometric device unlocking operation is precluded when the one or more images depict the subject in a state of lagophthalmos.

In one or more embodiments, to ensure that false positives do not lock a legitimate authorized user of an electronic device from their data, when the biometric device unlocking operation is precluded the authorized user can unlock the electronic device in other ways. Illustrating by example, in one or more embodiments when the orientation of the electronic device in three-dimensional space meets the at least one predefined criterion one or more processors of the electronic device may require entry of a personal identification number or password at the user interface to unlock the electronic device.

Additionally, embodiments of the disclosure contemplate that an authorized user may actually desire to unlock the device while the orientation of the electronic device relative to the subject of the one or more images of the biometric device unlocking operation meet the at least one predefined criterion. To accommodate this, in one or more embodiments one or more processors of the electronic device determine, from one or more images of a subject captured by an image capture device during a biometric device unlocking operation, whether the one or more images depict the subject expressing a predefined mien. In one or more embodiments, the preclusion of the completion of the biometric device unlocking operation only occurs when the one or more images fail to depict the subject expressing the predefined mien.

To provide further security for the authorized user, in one or more embodiments when the orientation of the electronic device relative to the subject meets the at least one predefined criterion and the completion of the biometric device unlocking operation is precluded, such as may be the case when a nefarious actor is attempting to gain access to an electronic device while its authorized user is in a state of lagophthalmos, an additional alert is delivered to the user. In one or more embodiments, this additional alert is an audio alert. In other embodiments, this alert comprises electronic signals delivered to a companion electronic device allowing that companion electronic device to deliver a haptic response to the authorized user of the electronic device. Other examples of supplemental alerts will be obvious to those of ordinary skill in the art having the benefit of this disclosure.

In some embodiments, the biometric device unlocking operation is precluded from completion when either (1) the electronic device is tilted into an orientation in three-dimensional space to "portrait-align" with a person's face while in a state of lagophthalmos or alternatively (2) where a person's face is determined to be in a sleeping orientation relative to the 3D orientation of the device. The former means that the image capture device is pointing downwards with alignment approaching the gravity vector or the electronic device is rotated into landscape to "portrait-align" with a person sleeping on their side. This requires depictions of the face of a subject to always be "portrait-aligned" with the electronic device for the biometric device unlocking operation to complete.

The latter occurs when the image capture device is pointing downwards in-line with the gravity vector. In such cases the biometric device unlocking operation would be precluded for all face rotations relative to the electronic device. However, when the electronic device is being held in other orientations, face alignment is estimated relative to the device orientation and if the face appears near perpendicular to the gravity vector, the biometric device unlocking operation is precluded from completion. This latter method actually would complete the biometric device unlocking operation with the electronic device held in landscape and user sitting upright.

Thus, in one or more embodiments an electronic device comprises a user interface, one or more sensors operable to determine an orientation of the electronic device in three-dimensional space relative to a gravity direction, and one or more processors operable with the user interface and the one or more sensors. In one or more embodiments, the one or more processors, in response to the user interface receiving user input initiating an operation to unlock the electronic device from a locked state, preclude the operation to unlock the electronic device from completing when the gravity direction is substantially aligned with a minor dimension of the electronic device extending from a first major surface to a second major surface of the electronic device. In other embodiments, the biometric device unlocking operation is precluded simply when one or more images captured during a biometric device unlocking operation depict a subject in a state of lagophthalmos.

Figure 11:
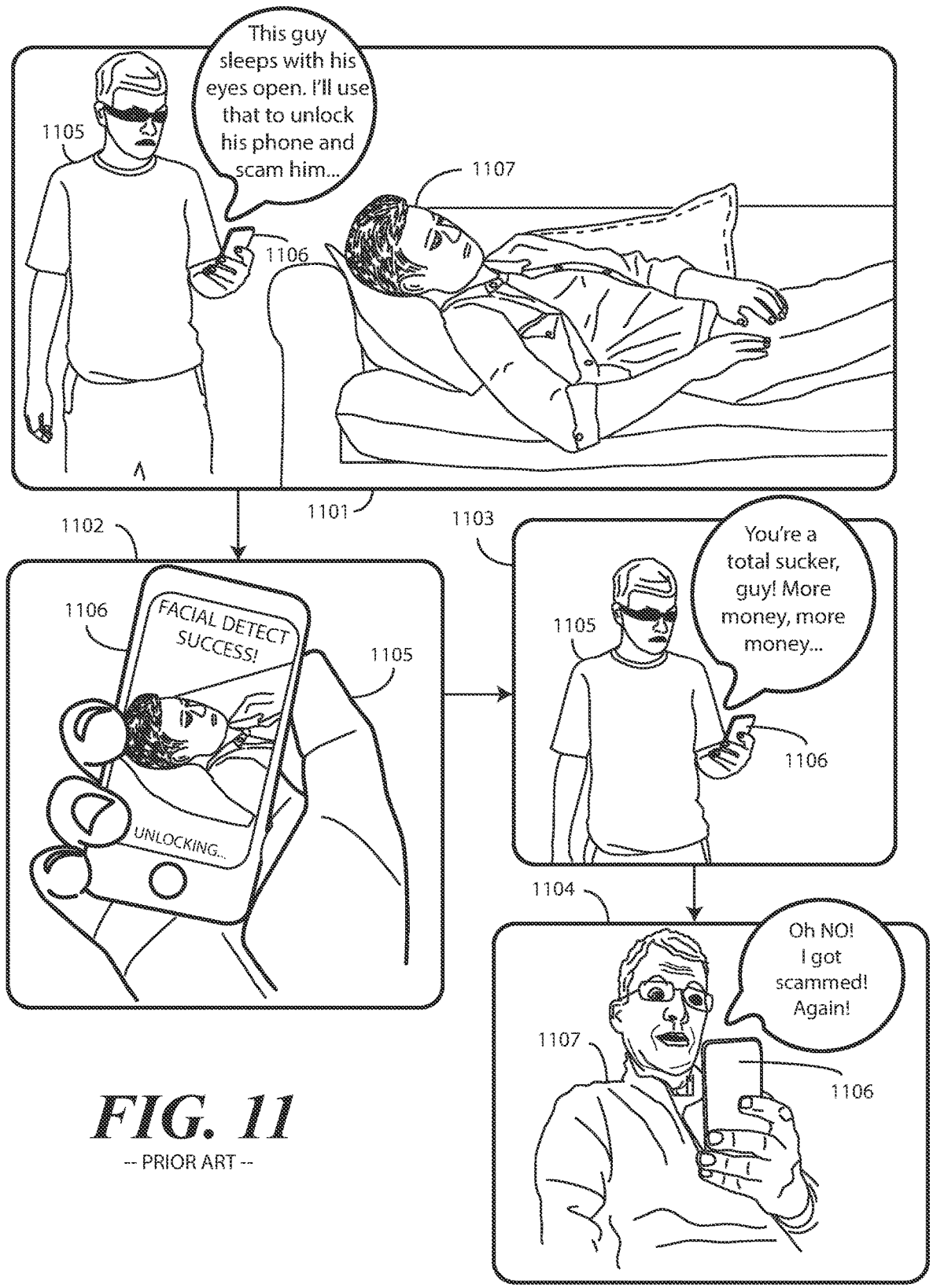
FIG. 11 illustrates a prior art method.

Advantageously, embodiments of the disclosure prevent the unfortunate situation occurring above with reference to FIG. 11. Embodiments of the disclosure allow a person who sleeps in a state of lagophthalmos to sleep confidently and comfortably, knowing that their data, financial assets, and other information accessible with an electronic device will be safe. Other advantages will be described below. Still others will be obvious to those of ordinary skill in the art having the benefit of this disclosure.

To see how embodiments of the disclosure can work, turn now to FIG. 1. Beginning at step 101, our not so friendly nefarious actor 1105 is once again attempting to gain access to data and other information belonging to an authorized user 1107 is in a state of lagophthalmos. However, in contrast to the method described above with reference to FIG. 11, in FIG. 1 the authorized user 1107 owns an electronic device 100 configured in accordance with one or more embodiments of the disclosure.

As shown at step 101, the authorized user 1107 of the electronic device 100 is again in a state of lagophthalmos, where he is sleeping on a sofa with his eyes open. The nefarious actor 1105 sees this, and quickly grabs his electronic device 100 from a table nearby. Once again, the nefarious actor 1105 holds the electronic device 100 in a portrait orientation.

At step 102, a user interface 112 of the electronic device 100 detects initiation of a biometric device unlocking operation from user input 113 input received at the user interface 112. In this illustrative example, the user input 113 comprises the actuation of a user actuation target presented on the user interface 112. However, as will be described with reference to FIG. 3 below, the biometric device unlocking operation can be initiated in other ways as well.

Illustrating by example, in another embodiment initiation of the biometric device unlocking operation occurs in response to actuation of a power key positioned along a housing of the electronic device 100. In other embodiments, initiation of the biometric device unlocking operation occurs in response to a lifting operation raising the electronic device 100 against a gravity direction 114. Other techniques for initiating a biometric device unlocking operation will be obvious to those of ordinary skill in the art having the benefit of this disclosure.

Decision 103 determines whether the electronic device 100 is in a locked state. If the device is unlocked, step 105 does nothing as information in the electronic device 100 is freely accessible. However, when the electronic device 100 is in a locked state, decision 104 determines whether the user input 113 defines a request to unlock the device.

Embodiments of the disclosure contemplate that some features of, and information provided by, the electronic device 100 may be accessible when the electronic device 100 is in a locked state. Illustrating by example, a person may be able to review peek notifications, check the weather, determine the time of day, access an image capture device, or operate a flashlight while the electronic device 100 is locked. For user input 113 requesting such operations, step 105 does nothing and allows the operation to occur. However, when the user input 113 requests an unlocking operation, such as by initiating a biometric device unlocking operation, the method moves to step 106.

At step 106, one or more sensors of the electronic device 100 determine an orientation of the electronic device 100 in three-dimensional space 115 relative to a subject of the biometric device unlocking operation, which in this illustrative example is the authorized user 1107 of the electronic device 100. Decision 107 then determines whether the orientation of the electronic device 100 in the three-dimensional space 115 relative to the subject meets at least one predefined criterion. The predefined criterion considered at decision 107 can vary.

In one or more embodiments, the at least one predefined criterion considered at decision 107 comprises a major axis 117 of a major surface 116 of the electronic device 100 substantially aligning with the gravity direction 114 detected by one or more sensors of the electronic device while one or more images 119 of a subject captured by an image capture device during the biometric device unlocking operation depict the subject in a landscape orientation. (This exact predefined criterion is shown at step 110 in this illustrative example.) As shown at step 110, the orientation of the electronic device 100 in the three-dimensional space 115 is, or substantially is, a portrait orientation relative to a gravity direction 114 while oriented perpendicularly, or substantially perpendicularly, relative to the subject depicted in the one or more images 119.

In other embodiments, the at least one predefined criterion considered at decision 107 comprises a minor axis 118 of a major surface 116 of the electronic device 100 substantially aligning with a gravity direction 114 detected by one or more sensors of the electronic device 100 while one or more images 119 of a subject captured by an image capture device during the biometric unlocking operation depict the subject in a portrait orientation.

In still other embodiments, the at least one predefined criterion considered at decision 107 comprises the gravity direction 114 substantially aligning with a minor dimension (into the page in FIG. 1) of a minor surface (oriented substantially orthogonally with the major surface 116 shown) of the electronic device 100. An example of this is shown in FIG. 4.

Figure 4:
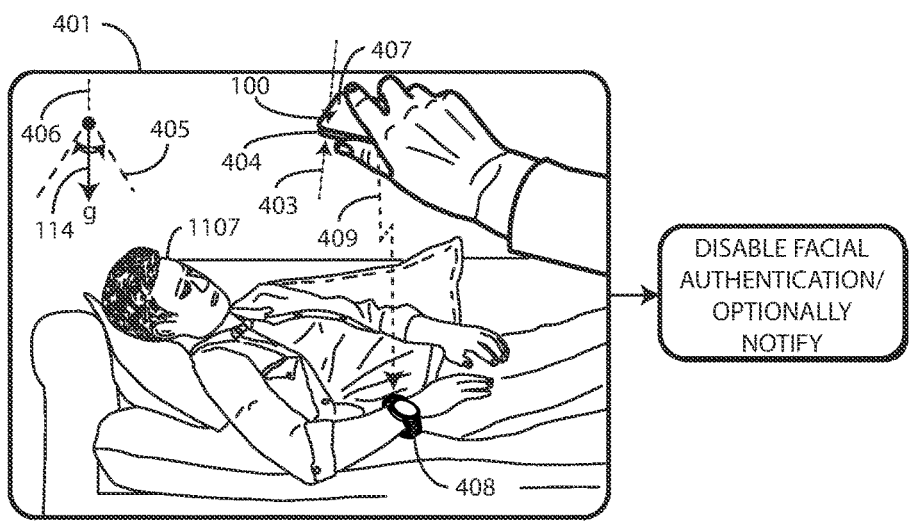
FIG. 4 illustrates one or more method steps in accordance with one or more embodiments of the disclosure.

Turning briefly to FIG. 4, in this example a minor dimension 403 of a minor surface 404 of the electronic device 100 is substantially aligned with the gravity direction 114. Said differently, at step 401 of FIG. 4 the gravity direction passes through the minor dimension 403 of the electronic device 100 within a cone of directions 405 centered around an axis 406 oriented normally with a major surface 407 of the electronic device 100. Indeed, in this illustrative example the gravity direction 114 passes substantially through the minor dimension 403 of the electronic device 100 from a rear surface to a front surface (comprising a display as shown in FIG. 1) within the cone of directions 405 centered around the axis 406 oriented normally with the major surface 407 of the electronic device 100.

In still other embodiments, one example of which happens to also be shown at step 401 of FIG. 4, the at least one predefined criterion considered at decision (107) comprises the gravity direction 114 detected by one or more sensors of the electronic device 100 being oriented substantially orthogonally relative to depictions of the subject captured by an image capture device during the biometric device unlocking operation. Since the electronic device 100 is being held horizontally above the subject at step 401, this results in the gravity direction 114 running from the electronic device 100 to the authorized user 1107 of the electronic device 100, which is substantially orthogonally. In one or more embodiments, this can be detected by the gravity direction 114 passing through a minor dimension of a minor surface of the electronic device 100.

Turning now back to FIG. 1, when decision 107 determines that the orientation of the electronic device 100 in three-dimensional space 115 relative to the subject meets at least one predefined criterion, step 109 comprises one or more processors of the electronic device 100 precluding the biometric device unlocking operation from completing. Otherwise, the biometric device unlocking operation is performed at step 108.

In this illustrative example, since the authorized user 1107 of the electronic device 100 is in the state of lagophthalmos, step 109 is performed and the biometric device unlocking operation is precluded from completion. Other optional steps can be performed as well.

Illustrating by example, as shown at step 110 a fraudulent activity alert can be presented on the user interface 112 of the electronic device 100 indicating that the biometric device unlocking operation has been precluded. In another example, the one or more processors of the electronic device 100 can cause an audio output device to deliver an audible alert 120 to the environment of the electronic device 100.

In still other examples, turning once again briefly to FIG. 4, the one or more processors of the electronic device 100 can cause audio output device to deliver an alert 409 to a companion electronic device 408. Illustrating by example, the one or more processors of the electronic device 100 may cause the communication device to deliver the alert 409 to a smartwatch so that the smartwatch can deliver a haptic response to the authorized user 1107 of the electronic device 100 to wake the authorized user 1107, and so forth.

Turning now back to FIG. 1, in this illustrative example the one or more processors of the electronic device 100 both cause fraudulent activity alert can be presented on the user interface 112 of the electronic device 100 indicating that the biometric device unlocking operation has been precluded and cause an audio output device to deliver an audible alert 120 to the environment of the electronic device 100. This not only causes the nefarious actor 1105 to immediately drop the electronic device 100, but also wakes the authorized user 1107 of the electronic device 100 as well.

Advantageously, step 109 has prevented the nefarious actor 1105 from being able to hack the data and financial accounts of the authorized user 1107 of the electronic device 100. As shown at step 111, this fact makes the authorized user 1107 of the electronic device 100 become elated. He exclaims, "Not today, sucker! I hope you get caught." After successfully thwarting the fraud using embodiments of the disclosure, he decides to treat himself to a delicious blend of dragon well and jasmine pearl green tea.

Figure 2:
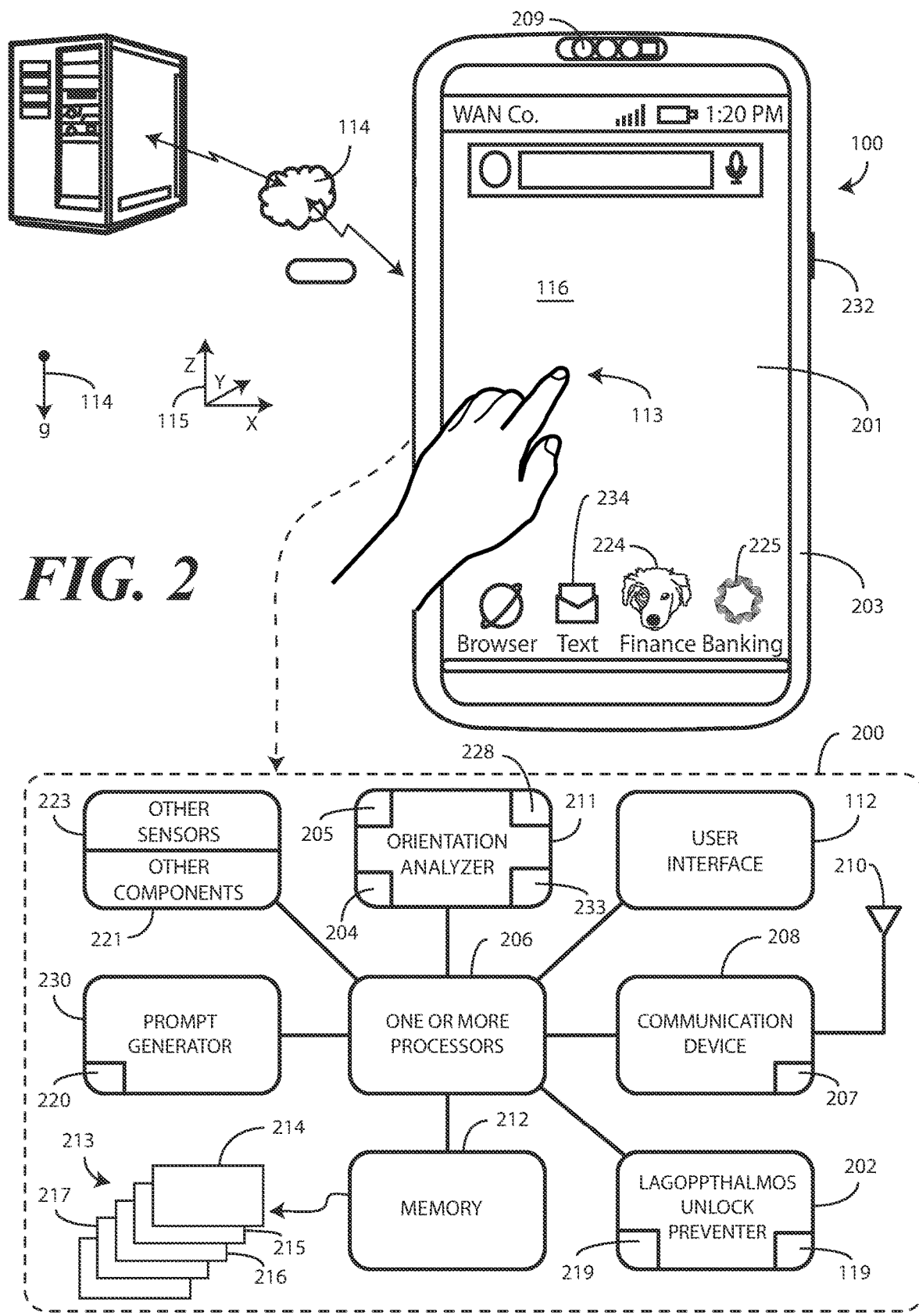
FIG. 2 illustrates one explanatory electronic device in accordance with one or more embodiments of the disclosure.

Turning now to FIG. 2, illustrated therein is one explanatory electronic device 100 configured in accordance with one or more embodiments of the disclosure. The electronic device 100 of this illustrative embodiment includes a user interface 112. In one or more embodiments, the user interface 112 comprises a display 201, which may optionally be touch-sensitive. The display 201 can serve as a primary user interface 112 of the electronic device 100.

Where the display 201 is touch sensitive, users can deliver user input to the display 201 by delivering touch input from a finger, stylus, or other objects disposed proximately with the display. In one embodiment, the display 201 is configured as an active-matrix organic light emitting diode (AMOLED) display. However, it should be noted that other types of displays, including liquid crystal displays, would be obvious to those of ordinary skill in the art having the benefit of this disclosure.

The explanatory electronic device 100 of FIG. 2 includes a housing 203. Features can be incorporated into the housing 203. Examples of features that can be included along the housing 203 include an imager 209, shown as a camera in FIG. 2, or an optional speaker port. A user interface component 232, which may be a button or touch sensitive surface, can also be disposed along the housing 203.

A block diagram schematic 200 of the electronic device 100 is also shown in FIG. 2. In one embodiment, the electronic device 100 includes one or more processors 206.

In one embodiment, the one or more processors 206 can include an application processor and, optionally, one or more auxiliary processors. One or both of the application processor or the auxiliary processor(s) can include one or more processors.

One or both of the application processor or the auxiliary processor(s) can be a microprocessor, a group of processing components, one or more Application Specific Integrated Circuits (ASICs), programmable logic, or other type of processing device. The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 212, can optionally store the executable software code used by the one or more processors 206 during operation.

In this illustrative embodiment, the electronic device 100 also includes a communication device 208 that can be configured for wired or wireless communication with one or more other devices or networks. The networks can include a wide area network, a local area network, and/or personal area network. The communication device 208 may also utilize wireless technology for communication, such as, but are not limited to, peer-to-peer, or ad hoc communications such as HomeRF, Bluetooth and IEEE 802.11 based communication, or alternatively via other forms of wireless communication such as infrared technology. The communication device 208 can include wireless communication circuitry, one of a receiver, a transmitter, or transceiver, and one or more antennas 210.

The electronic device 100 can optionally include a near field communication circuit 207 used to exchange data, power, and electrical signals between the electronic device 100 and another electronic device. In one embodiment, the near field communication circuit 207 is operable with a wireless near field communication transceiver, which is a form of radio-frequency device configured to send and receive radio-frequency data to and from the companion electronic device or other near field communication objects.

Where included, the near field communication circuit 207 can have its own near field communication circuit controller in one or more embodiments to wirelessly communicate with companion electronic devices using various near field communication technologies and protocols. The near field communication circuit 207 can include—as an antenna-a communication coil that is configured for near-field communication at a particular communication frequency. The term "near-field" as used herein refers generally to a distance of less than about a meter or so. The communication coil communicates by way of a magnetic field emanating from the communication coil when a current is applied to the coil. A communication oscillator applies a current waveform to the coil. The near field communication circuit controller may further modulate the resulting current to transmit and receive data, power, or other communication signals with companion electronic devices.

In one embodiment, the one or more processors 206 can be responsible for performing the primary functions of the electronic device 100. For example, in one embodiment the one or more processors 206 comprise one or more circuits operable to present presentation information, such as images, text, and video, on the display 201. The executable software code used by the one or more processors 206 can be configured as one or more modules 213 that are operable with the one or more processors 206. Such modules 213 can store instructions, control algorithms, and so forth.

In one embodiment, the one or more processors 206 are responsible for running the operating system environment 214. The operating system environment 214 can include a kernel, one or more drivers, and an application service layer 215, and an application layer 216. The operating system environment 214 can be configured as executable code operating on one or more processors or control circuits of the electronic device 100.

The application service layer 215 can be responsible for executing application service modules. The application service modules may support one or more applications 217 or "apps." Examples of such applications include a cellular telephone application for making voice telephone calls, a web browsing application configured to allow the user to view webpages on the display 201 of the electronic device 100, a text messaging application 234 configured to send and receive electronic communications, an electronic mail application configured to send and receive electronic mail, a photo application configured to organize, manage, and present photographs on the display 201 of the electronic device 100, and a camera application for capturing images with the imager 209. Collectively, these applications constitute an "application suite." In one or more embodiments, these applications comprise one or more financial applications 224 and/or banking applications 225 that allow financial transactions to be made using the electronic device 100.

In one or more embodiments, the electronic device comprises a biometric device unlocking operation preclusion module 202. The biometric device unlocking operation preclusion module 202 can preclude a biometric device unlocking operation from completing when at least one predefined criterion 228 is met, examples of which include predefined criteria 228 indicating that a person is in a state of lagophthalmos.

Illustrating by example, in one or more embodiments the biometric device unlocking operation preclusion module 202, in response to the user interface 112 receiving user input 113 initiating an operation to unlock the electronic device 100 from a locked state, can preclude the operation to unlock the electronic device 100 from completing when a gravity direction 114 is substantially aligned with a minor dimension of the electronic device 100 extending from a first major surface (facing into the page in FIG. 2) to a second major surface (facing out of the page in FIG. 2). In one or more embodiments, the biometric device unlocking operation preclusion module 202 can preclude the operation to unlock the electronic device 100 from completing with the gravity direction 114 is oriented through a minor dimension (into the page in FIG. 2) of the electronic device 100 within a cone of directions (405) centered around an axis (406) oriented normally with a major surface 116 of the electronic device 100.

In one or more embodiments, the biometric device unlocking operation preclusion module 202 is operable with an orientation analyzer 211. The orientation analyzer 211 can include one or more accelerometers 204, gyroscopes 205, or other components. The orientation analyzer 211 can detect orientations and motion of the electronic device 100 in three-dimensional space 115.

Illustrating by example, the orientation analyzer 211 can detect lift to view or raise to view gestures by computing accelerometer 204 and gyroscope 205 data to determine the angular motion of the electronic device 100. When doing so, the orientation analyzer 211 can determine angular velocity as a vector quantity equal to the angular displacement divided by a change in time during which a lifting motion occurs. The orientation analyzer 211 can also determine speed by computing the arc length traveled divided by the change in time occurring during this travel. Additionally, in one or more embodiments the orientation analyzer 211 can determine the coordinates of the electronic device 100 in three-dimensional space 115 relative to the face of a user to initiate a biometric device unlocking operation.

In one or more embodiments, the biometric device unlocking operation preclusion module 202 only precludes the operation to unlock the electronic device 100 from completing when the display 201 defines a bottom side of the electronic device 100 in three-dimensional space 115, as was the case at step (401) of FIG. 4 described above. Said differently, in one or more embodiments the biometric device unlocking operation preclusion module 202 only precludes the operation to unlock the electronic device 100 from completing when the gravity direction 114 is oriented through the minor dimension of the electronic device 100 within a cone of directions (405) centered around an axis oriented normally with a major surface 116 of the electronic device 100 and when the display 201 defines the bottom side of the electronic device 100 in the three-dimensional space 115.

In one or more embodiments where the electronic device 100 comprises an image capture device 209 operable to receive light and capture one or more images of the environment to the electronic device 100, the biometric device unlocking operation preclusion module 202, in response to the user interface 112 receiving the user input 113 initiating the operation to unlock the electronic device 100, causes the image capture device 209 to capture one or more images 119 of a subject. The biometric device unlocking operation preclusion module 202 can then also preclude the operation to unlock the electronic device 100 from completing when the electronic device 100 is in a portrait orientation in the three-dimensional space 115 and the one or more images 119 depict the subject oriented orthogonally, or substantially orthogonally, with the portrait orientation of the electronic device 100.

In still other embodiments, the biometric device unlocking operation preclusion module 202 also preclude the operation to unlock the electronic device 100 from completing when the electronic device 100 is in a landscape orientation in the three-dimensional space 115 and the one or more images 119 depict the subject oriented parallel, or substantially parallel, with the landscape orientation of the electronic device 100.

In other embodiments, the biometric device unlocking operation preclusion module 202 can preclude the operation to unlock the electronic device 100 from completing with the one or more images 119 depict the eyes of the subject being closed. This additional benefit prevents the electronic device 100 from being unlocked by a nefarious actor when a person is sleeping outside a state of lagophthalmos. Moreover, any of the predefined criteria described above with reference to FIG. 1 can cause the biometric device unlocking operation preclusion module 202 to preclude the operation to unlock the electronic device from completing as well.

As noted above, it is conceivable that a legitimate user of the electronic device 100 may desire to unlock the electronic device 100 when the biometric device unlocking operation preclusion module 202 otherwise thinks that the electronic device 100 is being used upon a subject experiencing a state of lagophthalmos based upon the orientation of the electronic device 100, as detected by an orientation analyzer 211 that may include one or more accelerometers 204, gyroscopes 205, or other components. In one or more embodiments, this is permitted using the expression of one or more predefined miens 219.

As will be understood by those of ordinary skill in the art having the benefit of this disclosure, and as used herein, "mien" takes the ordinary English definition of a person's look or manner, especially one of a particular kind indicating their character or mood. As used with the biometric device unlocking operation preclusion module 202, a predefined mien 219 is an intentional facial or bodily pose or position in which the user places their face or body and serves as a biometric device unlocking operation preclusion override mechanism in one or more embodiments.

Illustrating by example, rather than staring blankly at the electronic device 100 for authentication, in one or more embodiments an authorized user can adopt a particular mien intentionally as a secret override factor causing the biometric device unlocking operation preclusion module 202 to allow the operation to unlock the electronic device 100 to complete normally. In one or more embodiments, the authorized user of the electronic device 100 is the only one who knows what the predefined mien 219 is. In one or more embodiments, override of the preclusion operation performed by the biometric device unlocking operation preclusion module 202 does not occur unless at least one predefined mien 219 is expressed.

Examples of predefined miens 219 include one of one or more raised eyebrows, one or more closed eyes, one or more fingers touching a face or in front of the face, forcing the mouth open, closing the mouth with a smile or frown, making an intentionally happy face, making an intentionally sad face, pulling the hair, or orienting the face in a particular direction, such as a profile view. Other examples of miens include looking up or looking down or standing in front of a structure, a door, a car, in bright light, and so forth. Other examples of miens will be obvious to those of ordinary skill in the art having the benefit of this disclosure.

In one or more embodiments, when the biometric device unlocking operation preclusion module 202 cause the image capture device 209 to capture one or more images 119 of a subject of a biometric device unlocking operation, the biometric device unlocking operation preclusion module 202 determines whether the one or more images 119 depict the subject expressing a predefined mien 219. Any preclusion by the biometric device unlocking operation preclusion module 202 of an operation to unlock the electronic device occurs only when the one or more images 119 fail to depict the subject expressing the predefined mien 219 in one or more embodiments.

In still other embodiments, the biometric device unlocking operation preclusion module 202 can allow the unlocking preclusion to be overridden in other ways. Illustrating by example, where the orientation analyzer 211 determines that an orientation of the electronic device 100 in three-dimensional space 115 relative to a subject meets at least one predefined criterion 228, the biometric device unlocking operation preclusion module 202 can require entry of a personal identification number or password at the user interface 112 to unlock the electronic device 100. Other override techniques causing the biometric device unlocking operation preclusion module 202 to allow an operation to unlock the electronic device 100 to complete will be obvious to those of ordinary skill in the art having the benefit of this disclosure.

In one or more embodiments, when the biometric device unlocking operation preclusion module 202 determines that an orientation of the electronic device 100 in three-dimensional space 115 determined by the orientation analyzer 211 meets at least one predefined criterion 228, other operations can be performed. Illustrating by example, a prompt generator 230 cause the user interface 112 to deliver a prompt 220 comprising a fraud warning indicating that the electronic device 100 is trying to be unlocked in a fraudulent manner. While the prompt shown above in FIG. 1 was a visual prompt, in other embodiments the prompt 220 comprises an audible prompt.

In one or more embodiments, the one or more processors 206 are responsible for managing the applications and all personal information received from the user interface 112 that is to be used by the finance application 224 and/or banking application 225 after the electronic device 100 is authenticated as a secure electronic device and the user identification credentials have triggered a login event. The one or more processors 206 can also be responsible for launching, monitoring, and killing the various applications and the various application service modules.

In one or more embodiments, the one or more processors 206 are operable to not only kill the applications, but also to expunge any and all personal data, data, files, settings, or other configuration tools when the electronic device 100 is reported stolen or when the finance application 224 and/or banking application 225 are used with fraudulent activity to wipe the memory 212 clean of any personal data, preferences, or settings of the person previously using the electronic device 100.

The one or more processors 206 can also be operable with other components 221. The other components 221, in one embodiment, include input components, which can include acoustic detectors as one or more microphones. The one or more processors 206 may process information from the other components 221 alone or in combination with other data, such as the information stored in the memory 212 or information received from the user interface.

The other components 221 can include a video input component such as an optical sensor, another audio input component such as a second microphone, and a mechanical input component such as button. The other components 221 can include one or more sensors 223, which may include key selection sensors, touch pad sensors, capacitive sensors, motion sensors, and switches. Similarly, the other components 221 can include video, audio, and/or mechanical outputs.

The one or more sensors 223 may include, but are not limited to, accelerometers 204, touch sensors 233, surface/housing capacitive sensors, audio sensors, and video sensors. Touch sensors 233 may be used to indicate whether the electronic device 100 is being touched at side edges. The other components 221 of the electronic device 100 can also include a device interface to provide a direct connection to auxiliary components or accessories for additional or enhanced functionality and a power source, such as a portable battery, for providing power to the other internal components and allow portability of the electronic device 100.

In one or more embodiments, the biometric device unlocking operation preclusion module 202, the prompt generator 230, and/or the orientation analyzer 211 can be operable with one or more processors 206. Other embodiments, the biometric device unlocking operation preclusion module 202, the prompt generator 230, and/or the orientation analyzer 211 can be configured as a component of the one or more processors 206 or configured as one or more executable code modules operating on the one or more processors 206. In other embodiments, the biometric device unlocking operation preclusion module 202, the prompt generator 230, and/or the orientation analyzer 211 can be standalone hardware components operating executable code or firmware to perform their functions. Other configurations for the biometric device unlocking operation preclusion module 202, the prompt generator 230, and/or the orientation analyzer 211 will be obvious to those of ordinary skill in the art having the benefit of this disclosure.

It is to be understood that FIG. 2 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 2 or may include a combination of two or more components or a division of a particular component into two or more separate components, and still be within the scope of the present disclosure.

Figure 3:
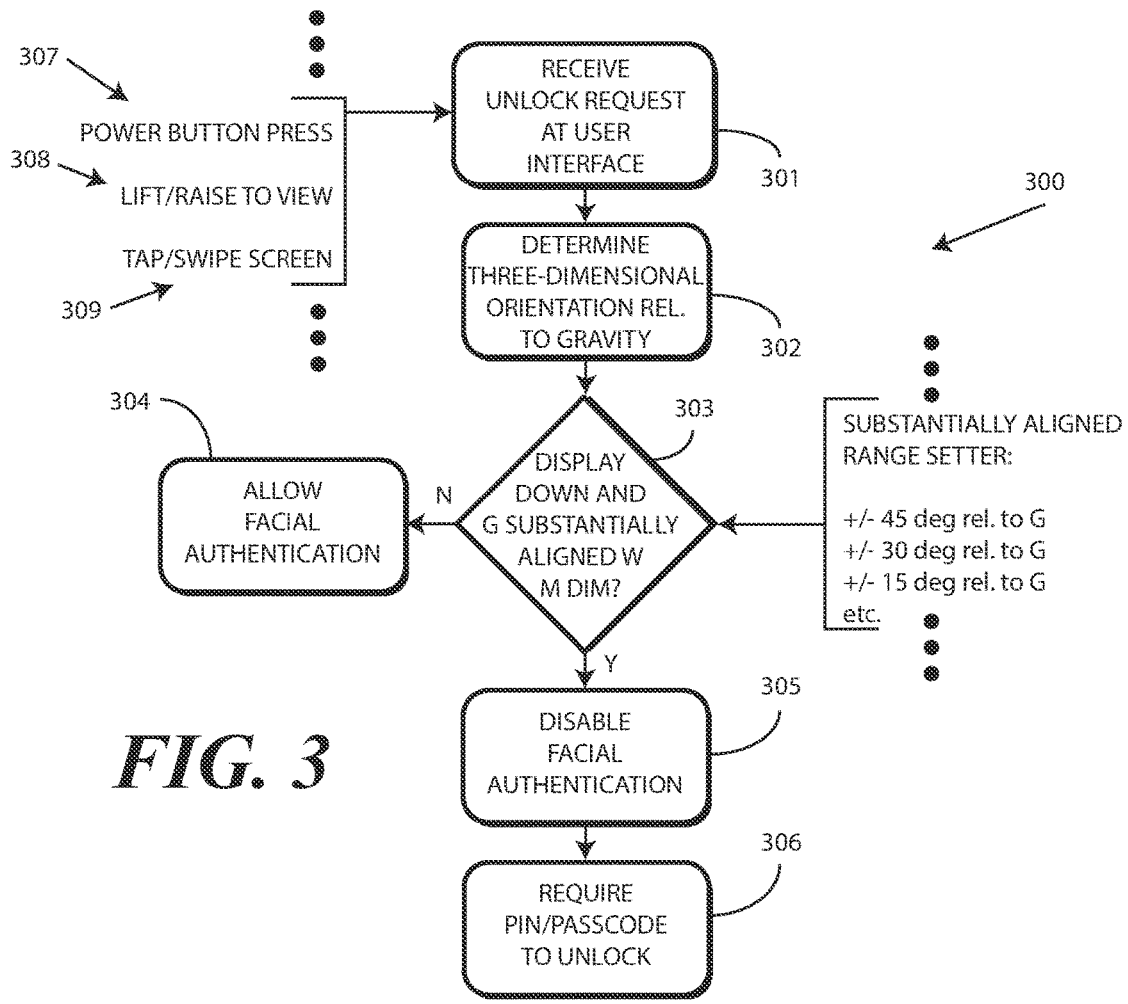
FIG. 3 illustrates one or more method steps in accordance with one or more embodiments of the disclosure.

Turning now to FIG. 3, illustrated therein is one explanatory method 300 suitable for use in an electronic device, one example of which is the electronic device (100) of FIGS. 1-2. The method 300 of FIG. 3 prevents a nefarious actor from holding an electronic device horizontally above a horizontally sleeping user with the display of the electronic device facing downward at the user (as shown at step (401) of FIG. 4).

Beginning at step 301, the method 300 detects, from a user interface, initiation of a biometric device unlocking operation from user input received at a user interface. As shown, the user input can vary. In one or more embodiments, the user input initiating the biometric device unlocking operation comprises actuation of a power key 307 positioned along a housing of the electronic device. In other embodiments, the user input initiating the biometric device unlocking operation comprises a lifting operation 308 raising the electronic device against a gravity direction.

In still other embodiments, the user input initiating the biometric device unlocking operation comprises user input 309 delivered to a display, as was described above with reference to FIG. 2. Other examples of user input that can be used to initiate a biometric device unlocking operation will be obvious to those of ordinary skill in the art having the benefit of this disclosure.

At step 302, the method 300 determines, using one or more sensors of the electronic device, an orientation of the electronic device in three-dimensional space relative to a subject upon whom the biometric device unlocking operation is being performed. Decision 303 then determines whether the orientation of the electronic device in three-dimensional space relative to the subject determined at step 302 meets at least one predefined criterion.

In this illustrative example, the predefined criterion comprises the gravity direction passing through a minor dimension of the electronic device within a cone of directions centered around an axis oriented normally with a major surface of the electronic device while the display defines a bottom major surface of the electronic device. (An electronic device (100) is shown in this configuration at step (401) of FIG. 4). The width of the cone of directions can vary, as shown in FIG. 3. Illustrating by example, the cone can be defined by an angle of fifteen degrees, thirty degrees, or forty-five degrees. Thus, while the electronic device (100) of FIG. 4 is not perfectly horizontal, the gravity direction (114)

still falls within the cone of directions (405) since the angle defining the cone of directions (405) is thirty degrees in that example.

Where this is the case, step 305 precludes the biometric device unlocking operation from completing. Otherwise, step 304 allows the biometric device unlocking operation to complete. As noted above, step 306 can provide an override option by requiring, by one or more processors, entry of a personal identification number or password at the user interface to unlock the electronic device.

Figure 5:
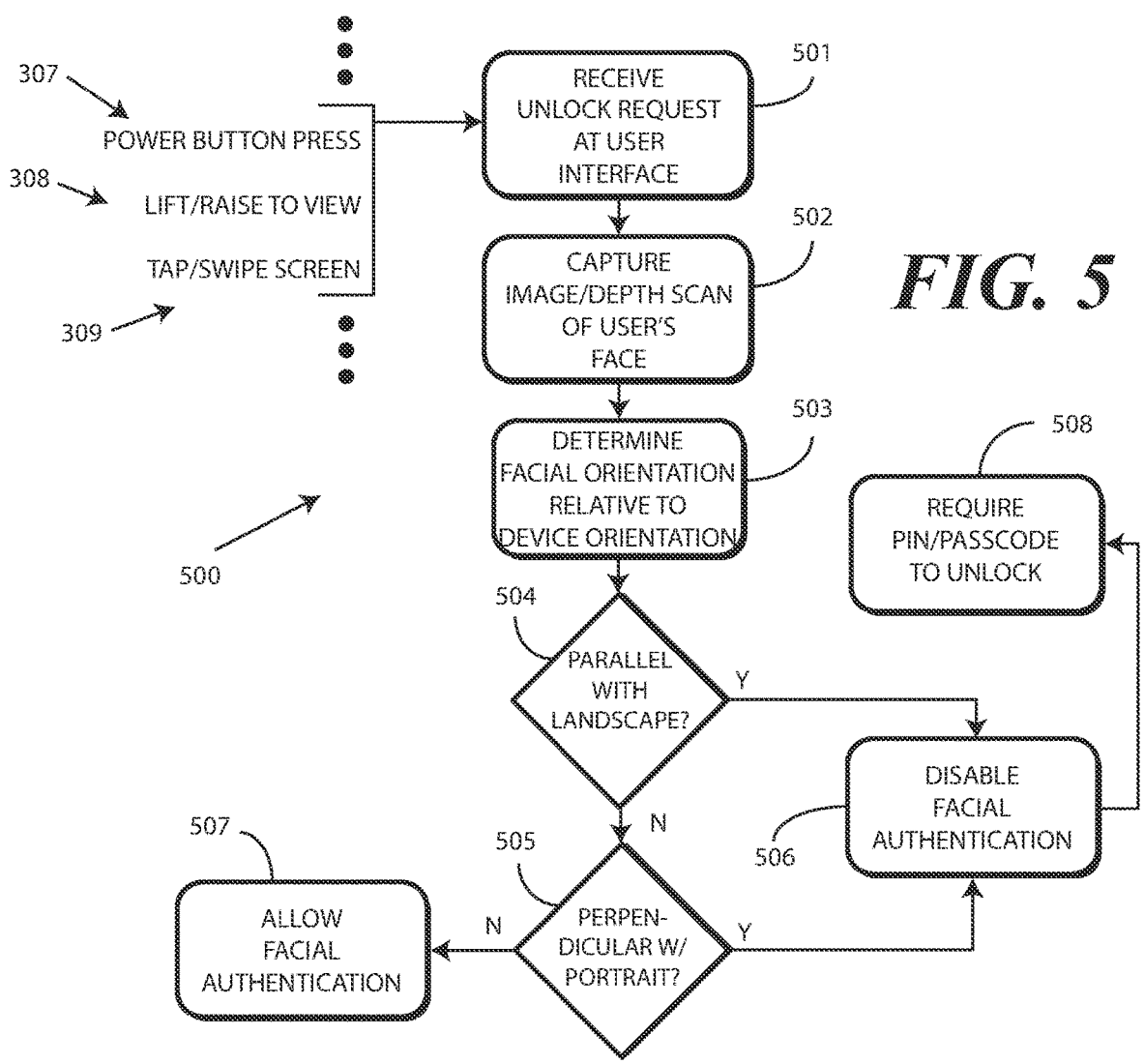
FIG. 5 illustrates one or more other method steps in accordance with one or more embodiments of the disclosure.

Turning now to FIG. 5, illustrated therein is another explanatory method 500 in accordance with one or more embodiments of the disclosure to prevent biometric unlocking of an electronic device when a person is a state of lagophthalmos. The method 500 of FIG. 5 precludes a device unlocking operation from completing when one or more images captured of a subject depict the subject in a state of lagophthalmos. Advantageously, the method 500 of FIG. 5 prevents a nefarious actor from taking a picture of a person sleeping on a horizontal surface from the side and unlocking their electronic device.

Beginning at step 501, the method 500 detects, from a user interface, initiation of a device unlocking operation from user input received at a user interface. As before, the user input can vary. Examples of user input initiating a device unlocking operation comprise actuation of a power key 307 positioned along a housing of the electronic device, a lifting operation 308 raising the electronic device against a gravity direction, or touch input 309 delivered to a display. Other examples of user input that can be used to initiate a biometric device unlocking operation will be obvious to those of ordinary skill in the art having the benefit of this disclosure.

At step 502, the method 500 captures, using an image capture device in response to the initiation of the device unlocking operation, one or more images of a subject situated within an environment of the electronic device. The one or more images can take different forms.

In one or more embodiments, the electronic device is equipped with a two-dimensional imager configured to receive at least one image of a person within an environment of the electronic device. In one embodiment, the imager comprises a two-dimensional Red-Green-Blue (RGB) imager. Accordingly, the one or more images captured of the user would be RGB images.

However, in other embodiments the imager comprises an infrared imager. In such a situation the one or more images captured of the user would be infrared images.

In still other embodiments, the imager comprises a depth imager. The depth imager can take a variety of forms.

In a first embodiment, the depth imager comprises a pair of imagers separated by a predetermined distance, such as three to four images. This "stereo" imager works in the same way the human eyes do in that it captures images from two different angles and reconciles the two to determine distance.

In another embodiment, the depth imager employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment, the depth imager comprises a time-of-flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained.

These imagers can be used in combination, of course. Illustrating by example, when included, and regardless of embodiment, the depth imager adds a third "z-dimension" to the x-dimension and y-dimension defining the two-dimensional image captured by, say, an RGB imager, thereby enhancing the detail of a person's face in the process of authentication by facial recognition. Other types of imagers suitable for use with the method 500 of FIG. 5 will be obvious to those of ordinary skill in the art having the benefit of this disclosure.

At step 503, one or more processors of the electronic device determine the orientation of the depictions of the face and/or torso of the person relative to the orientation of the electronic device in three-dimensional space to determine whether the one or more images depict the subject in a state of lagophthalmos. In one or more embodiments, this step 503 comprises determining an orientation of the electronic device in three-dimensional space relative to a gravity direction when the one or more images of the subject are captured.

Thereafter, decision 504 and decision 505 determine whether the one or more images depict the subject in the state of lagophthalmos by determining whether the subject is being depicted horizontally in the one or more images. Illustrating by example, decision 504 determines whether the subject is depicted as being parallel, or substantially parallel, with a landscape orientation of the electronic device with their eyes open. If, for instance, a nefarious actor was capturing images of a person sleeping on a bed by turning the electronic device to the landscape orientation, the resulting images would depict the user parallel with the landscape orientation. Where this is the case, step 506 comprises one or more processors of the electronic device precluding the device unlocking operation from completing since the one or more images would depict the subject in the state of lagophthalmos.

Similarly, decision 505 determines whether the one or more images depict the subject being oriented orthogonally, or substantially orthogonally, with the portrait orientation of the electronic device with their eyes open. An example of this is shown in FIG. 6.

Figure 6:
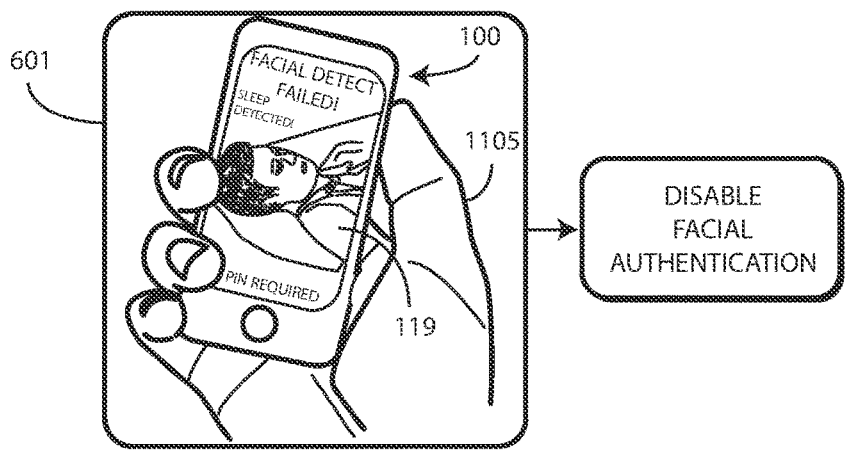
FIG. 6 illustrates still other method steps in accordance with one or more embodiments of the disclosure.

Turning briefly to FIG. 6, illustrated at step 601 is a nefarious actor 1105 using an electronic device 100 to capture one or more images 119 of a subject while the subject is sleeping on a horizontal surface with their eyes open. As shown, this results in the subject being depicted being substantially orthogonal with the portrait orientation of the electronic device.

Turning now back to FIG. 5, when either decision 504 determines the subject is depicted as being parallel, or substantially parallel, with a landscape orientation of the electronic device with their eyes open, or when decision 505 determines the subject is depicted as being oriented orthogonally, or substantially orthogonally, with the portrait orientation of the electronic device with their eyes open, step 506 precludes the device unlocking operation from completing. Otherwise, step 507 allows the device unlocking operation to complete. If step 506 is executed, optional step 508 can require entry of a personal identification number or password at the user interface to unlock the electronic device as previously described.

Accordingly, the method 500 of FIG. 5 comprises a facial recognition operation to as a device unlocking operation. In one or more embodiments, the method 500 captures, with an image capture device, one or more images of the subject at step 502. Advantageously, step 506 then precludes the biometric device unlocking operation from completing and prevents the electronic device from being unlocked when the one or more images depict the subject in a state of lagophthalmos.

Figure 7:
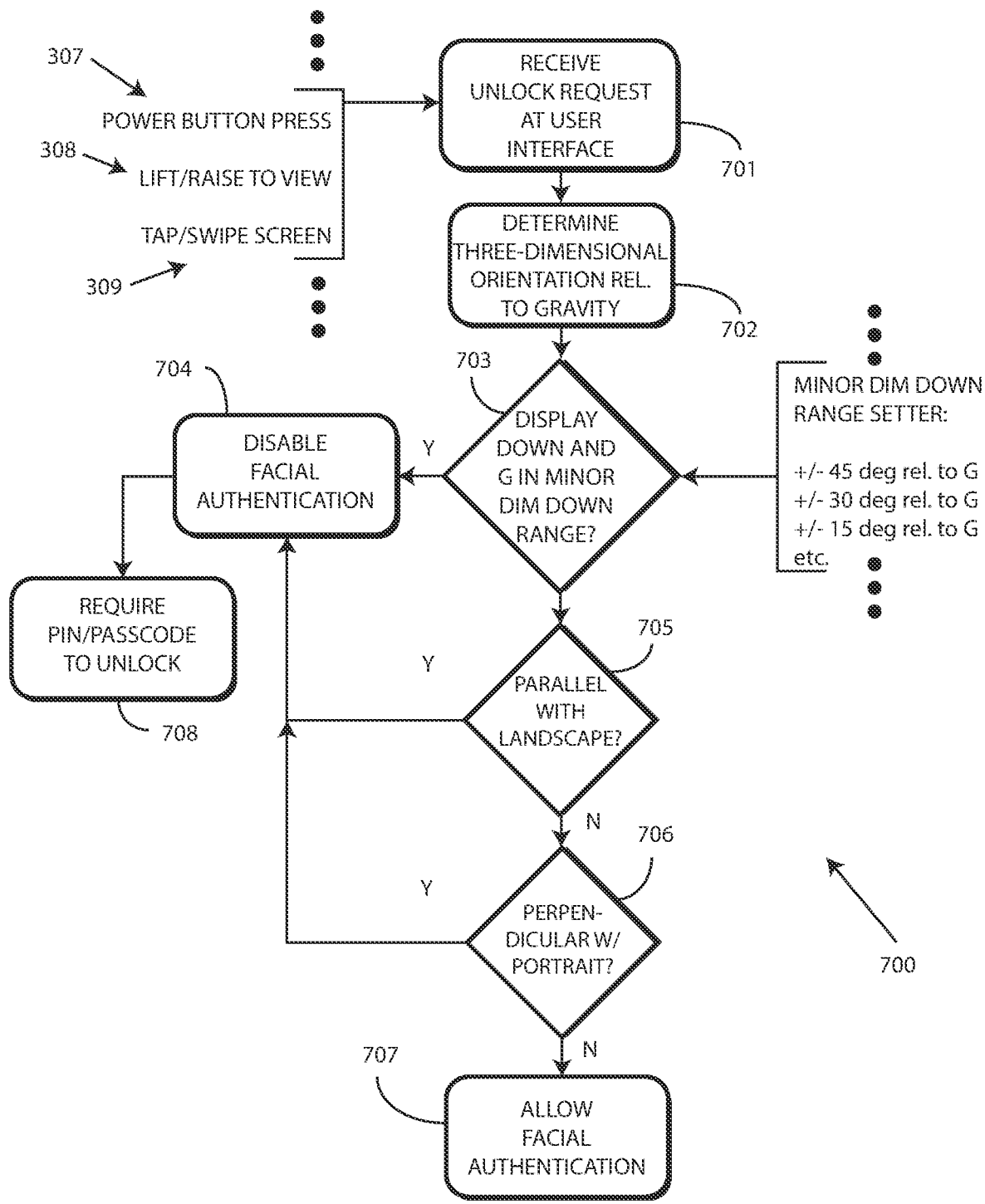
FIG. 7 illustrates additional method steps in accordance with one or more embodiments of the disclosure.

Turning now to FIG. 7, illustrated therein is still another method 700 in accordance with embodiments of the disclosure. The method 700 of FIG. 7 is a composite method looks for three alternate criteria to determine whether a subject of images of a biometric device unlocking operation is in a state of lagophthalmos, namely, whether the display defines a bottom side of the electronic device at decision 703, whether a subject is depicted being parallel with the landscape orientation of the electronic device at decision 705, or whether the subject is depicted being perpendicular with a portrait orientation of the electronic device. Effectively, the method 700 of FIG. 7 synthesizes the method (300) of FIG. 3 and the method (500) of FIG. 5.

Beginning at step 701, the method 700 detects, from a user interface, initiation of a biometric device unlocking operation from user input received at a user interface. As shown, the user input can vary. In one or more embodiments, the user input initiating the biometric device unlocking operation comprises actuation of a power key 307 positioned along a housing of the electronic device. In other embodiments, the user input initiating the biometric device unlocking operation comprises a lifting operation 308 raising the electronic device against a gravity direction.

In still other embodiments, the user input initiating the biometric device unlocking operation comprises user input 309 delivered to a display. Other examples of user input that can be used to initiate a biometric device unlocking operation will be obvious to those of ordinary skill in the art having the benefit of this disclosure.

At step 702, the method 700 determines, using one or more sensors of the electronic device, an orientation of the electronic device in three-dimensional space relative to a subject upon whom the biometric device unlocking operation is being performed. Decision 703 then determines whether the orientation of the electronic device in three-dimensional space relative to the subject determined at step 702 meets at least one predefined criterion.

The predefined criterion determined at decision 703 comprises the gravity direction passing through a minor dimension of the electronic device within a cone of directions centered around an axis oriented normally with a major surface of the electronic device while the display defines a bottom major surface of the electronic device. Where this is the case, step 704 precludes the biometric device unlocking operation from completing. Otherwise, the method 700 moves to decision 705.

Decision 705 and decision 706 determine whether the one or more images depict the subject in the state of lagophthalmos by determining whether the subject is being depicted horizontally in the one or more images. Illustrating by example, decision 705 determines whether the subject is depicted as being parallel, or substantially parallel, with a landscape orientation of the electronic device with their eyes open. Where this is the case, step 704 comprises one or more processors of the electronic device precluding the device unlocking operation from completing since the one or more images would depict the subject in the state of lagophthalmos.

Similarly, decision 706 determines whether the one or more images depict the subject being oriented orthogonally, or substantially orthogonally, with the portrait orientation of the electronic device with their eyes open. Where this is the case, step 704 comprises one or more processors of the electronic device precluding the device unlocking operation from completing since the one or more images would depict the subject in the state of lagophthalmos.

Otherwise, step 707 allows the device unlocking operation to complete. If step 704 is executed, optional step 708 can require entry of a personal identification number or password at the user interface to unlock the electronic device as previously described.

Figure 8:
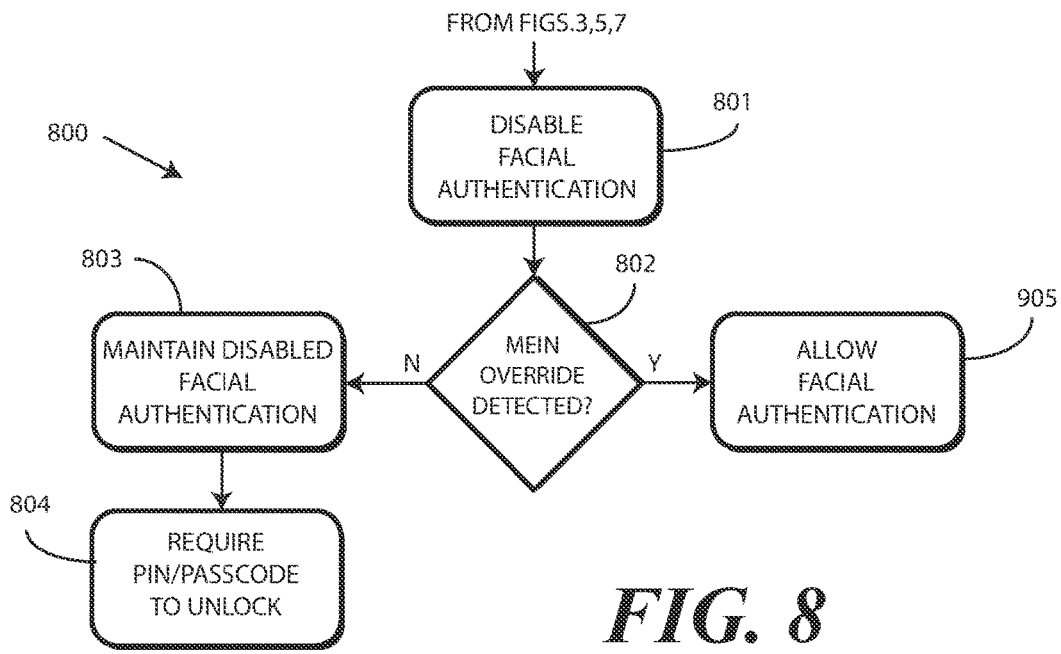
FIG. 8 illustrates one or more additional method steps in accordance with one or more embodiments of the disclosure.

Turning now to FIG. 8, illustrated therein is a method 800 for overriding the preclusion of any biometric device unlocking operation using a predefined mien. If, for example, a biometric device unlocking operation is prevented from occurring at step 801, decision 802 determines whether the subject of one or more images is expressing a predefined mien. An example of this is shown in FIG. 9.

Figure 9:
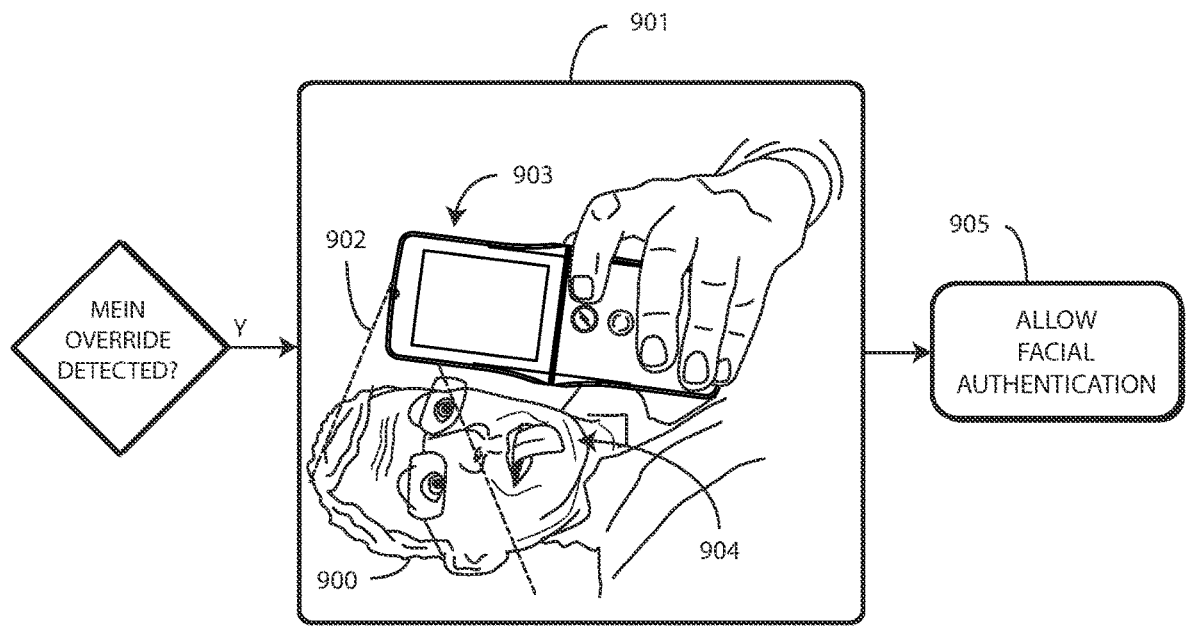
FIG. 9 illustrates one or more additional method steps in accordance with one or more embodiments of the disclosure.

Turning briefly to FIG. 9, at step 901 a subject 900 of one or more images 902 is attempting to execute a biometric device unlocking operation while laying on their side and holding an electronic device 903 in a landscape orientation relative to a gravity direction, which is downward in FIG. 9. Accordingly, this results in depictions of the subject 900 being substantially parallel with the landscape orientation of the electronic device 903 in the one or more images 902. The method (700) of FIG. 7 would attempt to preclude the biometric device unlocking operation from completing.

However, the subject 900 is expressing a predefined mien 904 by sticking their tongue out and downward. Accordingly, step 905 would override the biometric device unlocking operation preclusion and allow the biometric device unlocking operation to complete.

Turning now back to FIG. 8, when decision 802 determines that the one or more images of the subject depict the subject expressing a predefined mien, step 905 would override the biometric device unlocking operation preclusion and allow the biometric device unlocking operation to complete. Otherwise, step 803 would preclude the biometric device unlocking operation, with optional step 804 allowing a secondary override via the entry of a password or other authorized user credential.

Figure 10:
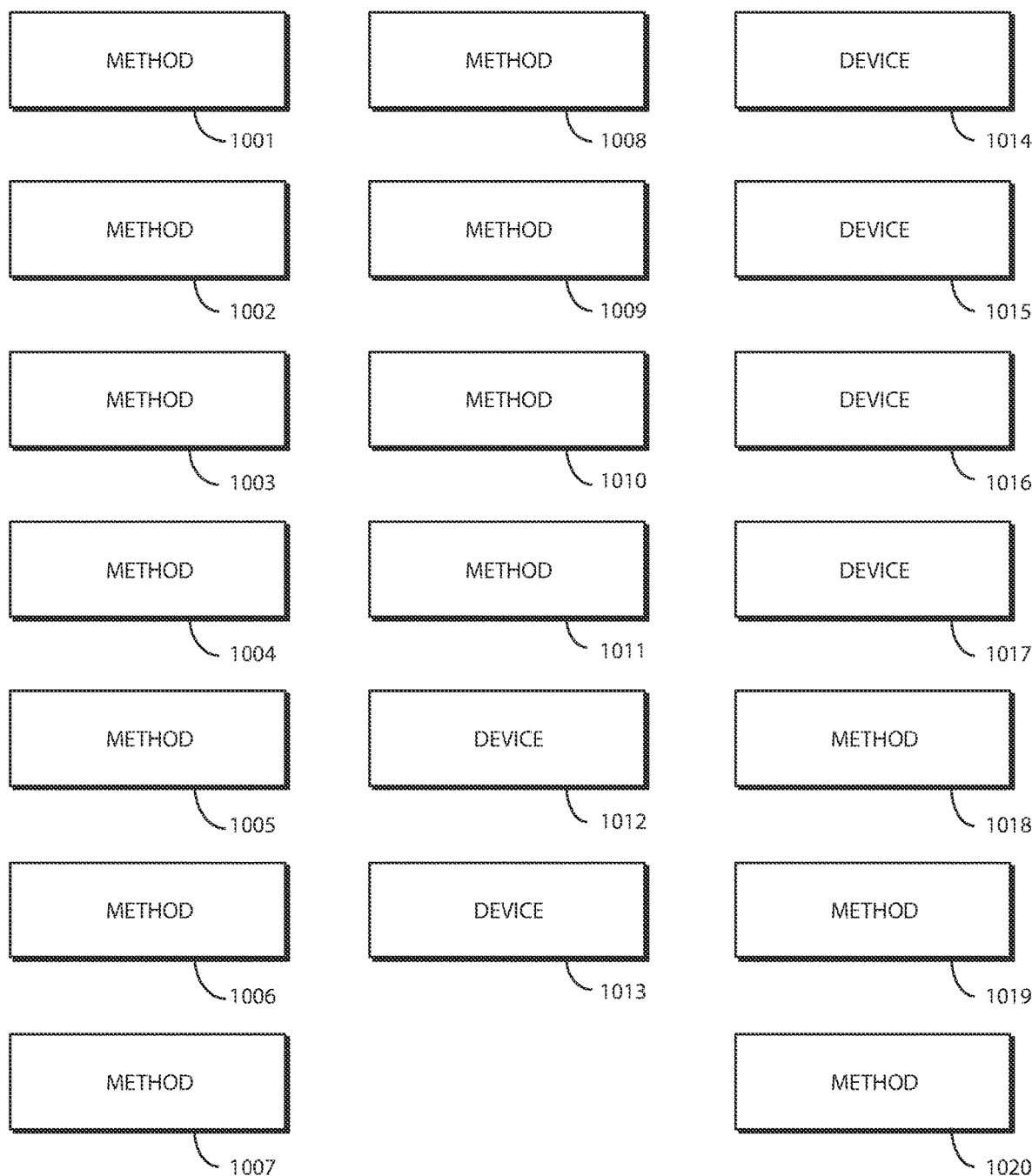
FIG. 10 illustrates one or more embodiments of the disclosure.

Turning now to FIG. 10, illustrated therein are various embodiments of the disclosure. The embodiments of FIG. 10 are shown as labeled boxes in FIG. 10 due to the fact that the individual components of these embodiments have been illustrated in detail in FIGS. 1-9, which precede FIG. 10. Accordingly, since these items have previously been illustrated and described, their repeated illustration is no longer essential for a proper understanding of these embodiments. Thus, the embodiments are shown as labeled boxes.

At 1001, a method for an electronic device comprises detecting, from a user interface, initiation of a biometric device unlocking operation from user input received at the user interface. At 1001, the method comprises determining, with one or more sensors of the electronic device, an orientation of the electronic device in three-dimensional space relative to a subject. At 1001, when the orientation of the electronic device in the three-dimensional space relative to the subject meets at least one predefined criterion, the method comprises precluding the biometric device unlocking operation from completing. Otherwise, the method comprises performing the biometric device unlocking operation.

At 1002, the at least one predefined criterion of 1001 comprises a major axis of a major surface of the electronic device substantially aligning with a gravity direction detected by one or more sensors of the electronic device while one or more images of a subject captured by an image capture device during the biometric device unlocking operation depict the subject in a landscape orientation. At 1003, the at least one predefined criterion of 1001 comprises a minor axis of a major surface of the electronic device substantially aligning with a gravity direction detected by one or more sensors of the electronic device while one or more images of a subject captured by an image capture device during the biometric unlocking operation depict the subject in a portrait orientation.

At 1004, the at least one predefined criterion of 1001 comprises a gravity direction substantially aligning with a minor dimension of a minor surface of the electronic device. At 1005, the at least one predefined criterion of 1001 comprises a gravity direction substantially aligning with a minor dimension of a minor surface of the electronic device from a rear major surface to a front major surface.

At 1006, the at least one predefined criterion of 101 comprises a gravity direction detected by one or more sensors of the electronic device being oriented substantially orthogonally relative to depictions of the subject captured by an image capture device during the biometric device unlocking operation or the gravity direction passing through a minor dimension of a minor surface of the electronic device. At 1007, the method of 1006 further comprises, when the orientation of the electronic device in the three-dimensional space relative to the subject meets the at least one predefined criterion, requiring, by one or more processors, entry of a personal identification number or password at the user interface to unlock the electronic device.

At 1008, the biometric device unlocking operation of 1006 comprises a facial recognition operation. At 1008, the method of 1006 further comprises capturing, with the image capture device, the one or more images of the subject and determining, by one or more processors, whether the one or more images depict the subject expressing a predefined mien. At 1008, the precluding the biometric device unlocking operation from completing occurs only when the one or more images fail to depict the subject expressing the predefined mien.

At 1009, the initiation of the biometric device unlocking operation of 1006 comprises one of actuation of a power key positioned along a housing of the electronic device or a lifting operation raising the electronic device against the gravity direction. At 1010, the method of 1001 further comprises, when the biometric device unlocking operation is precluded from completing, one of causing an audio output device to deliver an audible alert or causing a communication device to deliver an alert to a companion electronic device.

At 1011, the biometric device unlocking operation of 1001 comprises a facial recognition operation. At 1011, the method of 1001 further comprises capturing, with an image capture device, one or more images of the subject. At 1011, the precluding the biometric device unlocking operation from completing prevents the electronic device from being unlocked when the one or more images depict the subject in a state of lagophthalmos.

At 1012, an electronic device comprises a user interface and one or more sensors operable to determine an orientation of the electronic device in three-dimensional space relative to a gravity direction. At 1012, the electronic device comprises one or more processors operable with the user interface and the one or more sensors. At 1012, the one or more processors, in response to the user interface receiving user input initiating an operation to unlock the electronic device from a locked state, preclude the operation to unlock the electronic device from completing when the gravity direction is substantially aligned with a minor dimension of the electronic device extending from a first major surface to a second major surface of the electronic device. At 1013, the gravity direction of 1012 is substantially aligned with the minor dimension when the gravity direction and minor dimension define an angle of forty-five degrees or less.

At 1014, the electronic device of 112 further comprises a display. At 1014, the one or more processors only preclude the operation to unlock the electronic device from completing when the display defines a bottom side of the electronic device in the three-dimensional space.

At 1015, the electronic device of 1012 further comprises an image capture device comprising an image sensor operable to receive light and capture one or more images of an environment of the electronic device. At 1015, the one or more processors, in response to the user interface receiving the user input initiating the operation to unlock the electronic device, cause the image capture device to capture one or more images of a subject, and also preclude the operation to unlock the electronic device from completing when the electronic device is in a portrait orientation in the three-dimensional space and the one or more images depict the subject oriented orthogonally or substantially orthogonally with the portrait orientation.

At 1016, the one or more processors of 1015 also preclude the operation to unlock the electronic device from completing when the electronic device is in a landscape orientation in the three-dimensional space and the one or more images depict the subject oriented parallel or substantially parallel with the landscape orientation. At 1017, the one or more processors of 1016 also preclude the operation to unlock the electronic device from completing when the one or more images depict eyes of the subject that are closed.

At 1018, a method in an electronic device comprises detecting, from a user interface, initiation of a device unlocking operation. At 1018, the method comprises capturing, by an image capture device having an image sensor receiving light in response to the initiation of the device unlocking operation, one or more images of a subject situated within an environment of the electronic device.

At 1018, the method comprises determining, by one or more processors operable with the image capture device, whether the one or more images depict the subject in a state of lagophthalmos. At 1018, the method comprises precluding, by the one or more processors, the device unlocking operation from completing when the one or more images depict the subject in the state of lagophthalmos.

At 1019, the determining whether the one or more images depict the subject in the state of lagophthalmos of 1018 comprises determining an orientation of the electronic device in three-dimensional space relative to a gravity direction when the one or more images of the subject are captured. At 1020, the determining whether the one or more images depict the subject in the state of lagophthalmos of 1018 comprises determining the subject being depicted horizontally in the one or more images.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method for an electronic device, the method comprising:
   detecting, from a user interface, initiation of a biometric device unlocking operation from user input received at the user interface;
   determining, with one or more sensors of the electronic device, an orientation of the electronic device in three-dimensional space relative to a subject; and
   when the orientation of the electronic device in the three-dimensional space relative to the subject meets at least one predefined criterion, precluding the biometric device unlocking operation from completing; and
   otherwise, performing the biometric device unlocking operation;
   wherein:
   the biometric device unlocking operation comprises a facial recognition operation capturing one or more images of the subject; and
   the precluding prevents the electronic device from being unlocked when the one or more images depict the subject in a state of sleep.

2. The method of claim 1, wherein the at least one predefined criterion comprises a major axis of a major surface of the electronic device substantially aligning with a gravity direction detected by one or more sensors of the electronic device while one or more images of a subject captured by an image capture device during the biometric device unlocking operation depict the subject in a landscape orientation.

3. The method of claim 1, wherein the at least one predefined criterion comprises a minor axis of a major surface of the electronic device substantially aligning with a gravity direction detected by one or more sensors of the electronic device while one or more images of a subject captured by an image capture device during the biometric device unlocking operation depict the subject in a portrait orientation.

4. The method of claim 1, wherein the at least one predefined criterion comprises a gravity direction substantially aligning with a minor dimension of a minor surface of the electronic device.

5. The method of claim 1, wherein the at least one predefined criterion comprises a gravity direction substantially aligning with a minor dimension of a minor surface of the electronic device from a rear major surface to a front major surface.

6. The method of claim 1, wherein the at least one predefined criterion comprises:
   a gravity direction detected by one or more sensors of the electronic device being oriented substantially orthogonally relative to depictions of the subject captured by an image capture device during the biometric device unlocking operation; or
   the gravity direction passing through a minor dimension of a minor surface of the electronic device.

7. The method of claim 6, further comprising, when the orientation of the electronic device in the three-dimensional space relative to the subject meets the at least one predefined criterion, requiring, by one or more processors, entry of a personal identification number or password at the user interface to unlock the electronic device.

8. The method of claim 6, further comprising
   determining, by one or more processors, whether the one or more images depict the subject expressing a predefined mien,
   wherein the precluding the biometric device unlocking operation from completing occurs only when the one or more images fail to depict the subject expressing the predefined mien.

9. The method of claim 6, wherein the initiation of the biometric device unlocking operation comprises one of actuation of a power key positioned along a housing of the electronic device or a lifting operation raising the electronic device against the gravity direction.

10. The method of claim 1, further comprising, when the biometric device unlocking operation is precluded from completing, one of causing an audio output device to deliver an audible alert or causing a communication device to deliver an alert to a companion electronic device.

11. The method of claim 1, wherein the state of sleep comprises a state of lagophthalmos.

12. An electronic device, comprising:
    a user interface;
    one or more sensors operable to determine an orientation of the electronic device in three-dimensional space relative to a gravity direction;
    one or more processors operable with the user interface and the one or more sensors; and
    an image capture device comprising an image sensor operable to receive light and capture one or more images of an environment of the electronic device;
    wherein the one or more processors, in response to the user interface receiving user input initiating an operation to unlock the electronic device from a locked state, preclude the operation to unlock the electronic device from completing when:
    the gravity direction is substantially aligned with a minor dimension of the electronic device extending from a first major surface to a second major surface of the electronic device; and
    the one or more images depict a subject in a state of sleep.

13. The electronic device of claim 12, wherein the gravity direction is substantially aligned with the minor dimension when the gravity direction and minor dimension define an angle of forty-five degrees or less.

14. The electronic device of claim 12, further comprising a display, wherein the one or more processors only preclude the operation to unlock the electronic device from completing when the display defines a bottom side of the electronic device in the three-dimensional space.

15. The electronic device of claim 12, wherein the one or more processors, in response to the user interface receiving the user input initiating the operation to unlock the electronic device, cause the image capture device to capture one or more images of the subject, and also preclude the operation to unlock the electronic device from completing when the electronic device is in a portrait orientation in the three-dimensional space and the one or more images depict the subject oriented orthogonally or substantially orthogonally with the portrait orientation.

16. The electronic device of claim 15, wherein the one or more processors also preclude the operation to unlock the electronic device from completing when the electronic device is in a landscape orientation in the three-dimensional space and the one or more images depict the subject oriented parallel or substantially parallel with the landscape orientation.

17. The electronic device of claim 16, wherein the one or more images depict the subject in the state of sleep when eyes of the subject that are closed.

18. A method in an electronic device, the method comprising:
 detecting, from a user interface, initiation of a device unlocking operation;
 capturing, by an image capture device having an image sensor receiving light in response to the initiation of the device unlocking operation, one or more images of a subject situated within an environment of the electronic device;
 determining, by one or more processors operable with the image capture device, whether the one or more images depict the subject in a state of lagophthalmos; and
 precluding, by the one or more processors, the device unlocking operation from completing when the one or more images depict the subject in the state of lagophthalmos;
 wherein the determining whether the one or more images depict the subject in the state of lagophthalmos comprises determining an orientation of the electronic device in three-dimensional space relative to a gravity direction when the one or more images of the subject are captured.

19. The method of claim 18, wherein the state of lagophthalmos results in the one or more images depicting the subject sleeping with their eyes open.

20. The method of claim 18, wherein the determining whether the one or more images depict the subject in the state of lagophthalmos comprises determining the subject being depicted horizontally in the one or more images.

* * * * *